(12) United States Patent
Randazzo et al.

(10) Patent No.: US 9,022,335 B2
(45) Date of Patent: May 5, 2015

(54) BRACKET USED TO HOLD BOARDS IN THE CONSTRUCTION OF AN ICE RINK

(71) Applicants: Matthew Randazzo, Itasca, IL (US); Michael Barbanente, Itasca, IL (US)

(72) Inventors: Matthew Randazzo, Itasca, IL (US); Michael Barbanente, Itasca, IL (US)

(*) Notice: Subject to any disclaimer, the term of this patent is extended or adjusted under 35 U.S.C. 154(b) by 0 days.

(21) Appl. No.: 13/712,176

(22) Filed: Dec. 12, 2012

(65) Prior Publication Data

US 2013/0161467 A1    Jun. 27, 2013

Related U.S. Application Data

(60) Provisional application No. 61/570,164, filed on Dec. 13, 2011.

(51) Int. Cl.
| | | |
|---|---|---|
| E04C 3/02 | (2006.01) | |
| F16M 13/02 | (2006.01) | |
| E01C 13/10 | (2006.01) | |
| E02D 5/80 | (2006.01) | |

(52) U.S. Cl.
CPC ........ F16M 13/022 (2013.01); *E04C 2003/026* (2013.01); *E02D 5/803* (2013.01); E01C 13/102 (2013.01)

(58) Field of Classification Search
USPC ......... 248/351, 354.5, 357; 52/146, 149, 150, 52/102, 699, 127.2, 702, 698, 289
See application file for complete search history.

(56) References Cited

U.S. PATENT DOCUMENTS

| | | | |
|---|---|---|---|
| 718,164 A | 1/1903 | Smith et al. | |
| 1,382,082 A | 3/1919 | Heitzel | |
| 1,699,461 A * | 1/1929 | Burns | 52/150 |
| 2,035,944 A | 3/1939 | Browne | |
| 2,246,960 A * | 6/1941 | Tyson | 472/79 |
| 3,203,660 A * | 8/1965 | Bowden | 248/357 |
| 3,300,920 A * | 1/1967 | Skaare | 52/150 |
| 5,076,536 A * | 12/1991 | Fitzgerald | 249/219.1 |
| 5,622,021 A * | 4/1997 | Bookout | 52/582.1 |
| 5,690,305 A * | 11/1997 | Perkins | 248/200 |
| 5,843,327 A * | 12/1998 | Lindgren | 249/210 |
| 6,230,451 B1 * | 5/2001 | Stoller | 52/169.1 |
| 7,828,263 B2 | 11/2010 | Bennett | |
| 8,028,476 B1 | 10/2011 | Alford | |

\* cited by examiner

*Primary Examiner* — Alfred J Wujciak
(74) *Attorney, Agent, or Firm* — Helix Patent Services, LLC

(57) ABSTRACT

A bracket used to hold boards in the construction of an ice rink is disclosed. The bracket is made of steel, providing increased strength to allow for increased distance between each bracket. The bracket is easy to install and has improved retention into the soil. The bracket of the present invention has a horizontal member connected to a vertical member. The horizontal member prevents tipping in the direction of pressure exerted by the rink. The horizontal member is optionally hingedly connected to the vertical member, allowing the horizontal member to pivot to an open position, or a closed position to fold for off-season storage.

17 Claims, 9 Drawing Sheets

BRACKET USED TO HOLD BOARDS IN THE CONSTRUCTION OF AN ICE RINK

CROSS-REFERENCE TO RELATED APPLICATION

This application claims the benefit of U.S. Provisional Application No. 61/570,164, filed Dec. 13, 2011.

FIELD OF THE INVENTION

The present invention relates to a bracket for securing and supporting a structure, the structure preferably being an ice rink. The present invention has good retention in the soil and has a pivoting horizontal member secured to a vertical member, which prevents tipping in the direction of the pressure. The present invention is easily optionally foldable for storage in the off-season.

BACKGROUND OF THE INVENTION

When building an ice rink, the water pressure as well as the expansion of the ice when freezing applies large pressure to the boards that hold the water in. The boards need to be supported sufficiently to keep the water in even in the event of thaw and refreeze. Also any bracket that might be used can become a tripping hazard when people step out of the rink. Finally, when the rink is torn down in the summer, the boards and their supports need to be stored efficiently so they can be used again the following year.

Wooden stakes are difficult to install because a vertical stake as well as a diagonal stake need to be inserted into the ground. They also take up much space in the off-season, and they create a tripping hazard. Plastic brackets have a diagonal support brace, which can be a tripping hazard, and they are difficult to install into the ground because in order to get the strength needed, the spike needs to be fairly large. Plastic brackets also don't fold and take up much space in the off-season. The brackets in the prior art sometimes are weak and sometimes break when being installed. Because they are weaker, they need to be placed closer together to support the typical load. Other metal brackets don't fold, and they too take up much space in the off-season. Other metal brackets have a diagonal brace, which can be a tripping hazard.

SUMMARY OF THE INVENTION

When building an ice rink, the water pressure, as well as the expansion of the ice when freezing, applies large pressure to boards or a rink that hold the water in. The boards need to be supported sufficiently to keep the water in, even in the event of thaw and refreeze. Also, any bracket that might be used can become a tripping hazard when people step out of the rink. Finally, when the rink is torn down in the summer, the boards and their supports need to be stored efficiently so they can be used again the following year.

The function of the bracket of the present invention is to have resistance to bending in the direction normal to the boards. One end of the bracket aligns with the ground, while the other end supports the boards, which support the water that needs to be held inside the rink. The bracket of the present invention also has good retention in the soil. The bracket preferably is of sufficient rigidity and strength so that it doesn't bend or collapse under the load of the water above ground, and the resultant force against the earth upon the rest of the bracket, which is under ground. In addition, the bracket is preferably of sufficient strength to pass the load on to a horizontal member, which also helps keep the bracket from falling back through the resultant force of the ground upon it. Generally, both the strength and the rigidity are determined by the cross section of the member, specifically by the material properties, and the moment of inertia of the cross section. A bracket of the present invention is used to support a structure, generally having an elongated rigid channeled vertical member comprising at least one point of attachment on the vertical member, and an elongated rigid channeled horizontal member comprising at least one point of attachment on the horizontal member, and the at least one point of attachment of the horizontal member is hingedly connected to the at least one point of attachment of the vertical member.

The vertical member is formed in a channel that has the structural integrity to support the forces of water of a given depth, as well as the forces of the water freezing is pushed into the ground. The vertical member is a rigid elongated channel having a back wall, a first side wall and a second side wall, each side wall at 90 degree angles to the back wall. The vertical member has a superior end and an inferior end. At the superior end of the vertical member, there is at least one hole to engage a bracket to the boards of a rink. The vertical member also has at least one hole on each side wall anywhere from about ⅓ to ½ of the distance from the inferior end as the point of attachment for hingedly attaching the horizontal member to the vertical member with screws or pins.

The horizontal member also has an elongated channel with a back wall and a first side wall and second side wall at 90 degree angles to the back wall. At a first end of the horizontal member, are a first attaching member and a second attaching member, each having a hole to engage the hole on the vertical member about ⅓ to ½ from the inferior end of the vertical member via screws or pins. The horizontal member is hingedly attached to the vertical member, with at least two screws or pins, so that the horizontal member can pivot from a vertical position to a horizontal position. The horizontal member has a hole on the back wall at the first end and at a second end for receiving a stake into the ground when in use.

When removed from storage, the vertical member and horizontal member are collapsed and parallel to each other. When the bracket is used, the vertical member gets pushed into the ground, the horizontal member pivots from a closed position, to a horizontal position. When the horizontal member reaches the ground to the horizontal position, it is said to be in an open position, and it cannot pivot any further. This horizontal member then prevents any tipping of the vertical member in the direction of the forces resulting from the pressure of the water, as well as the pressure of the freezing of the water.

In addition, because the bracket doesn't need a diagonal member, it reduces the tripping hazard involved with traditional solutions to this problem. Finally, once removed from the ground, the bracket can fold to a flat position and be stored efficiently until the next season.

The bracket of the present invention is made of any of a variety of metals, therefore it can have adequate strength, while being smaller, than the brackets made of wood and plastic in the prior art. Because these brackets are stronger, the distance between the brackets may be increased from those distances used with brackets in the prior art. The bracket of the present invention does not require angular support, so they are less of a tripping hazard. The brackets of the present invention fold so they are easier to store in the off-season.

DETAILED DESCRIPTION OF THE INVENTION

Figure 1:
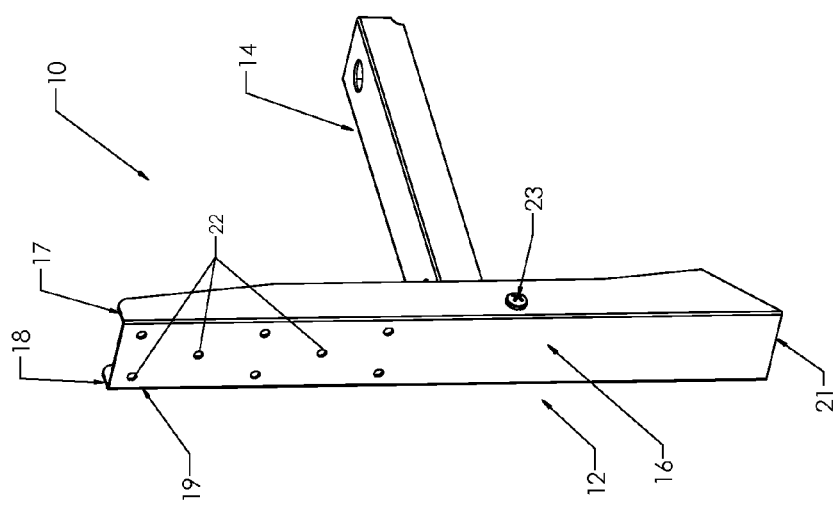
FIG. 1 illustrates a bracket in an open position for engaging board of an ice rink, having a vertical member engaging a horizontal member.

While the present disclosure may be susceptible to embodiments in different forms, the drawings show, and herein will be described in detail, embodiments with the understanding that the present description is to be considered an exemplification of the principles of the disclosure and is not intended to be exhaustive or to limit the disclosure to the details of construction and the arrangements of the components set forth in the following description or illustrated in the drawings.

Relating to FIG. 1, the bracket 10, in an open position, in the present invention comprises a vertical member 12 and a horizontal member 14. The vertical member is a rigid elongated channel having a vertical member back wall 16, a vertical member first side wall 17 and a vertical member second side wall 18, each side wall at 90 degree angles to the vertical member back wall 16. The vertical member has a superior end 19 and an inferior end 21. At the superior end 19 of the vertical member 12, optionally, there is at least one hole 22 to engage a bracket adaptor boards of a rink. Each vertical member each side wall 17, 18, has at least one hole 23, defining a point of attachment, anywhere from about ⅓ to ½ of the distance from the inferior end 21 as the point of attachment for hingedly connecting a channeled horizontal member 14 to the vertical member 12 with screws or pins.

Figure 2:
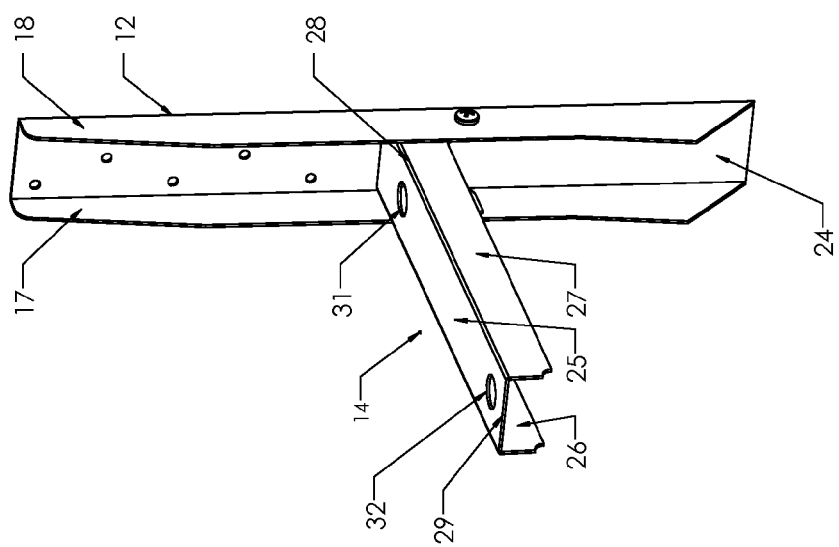
FIG. 2 illustrates a view of the inner side of the vertical bracket engaging a horizontal member.

FIG. 2 illustrates a view of the vertical member's 12 inner side 24, with the horizontal member 14 hingedly connected to the vertical member 12. The horizontal member also has a rigid elongated channel with a horizontal member back wall 25 and a horizontal member first side wall 26 and horizontal member second side wall 27 at 90 degree angles to the horizontal member back wall 25. The horizontal member 14 also has a first end 28 and a second end 29. The horizontal member back wall 25 has a first hole 31 for receiving a stake during installation and an optional second hole 32 for optionally receiving a stake during installation.

Figure 3:
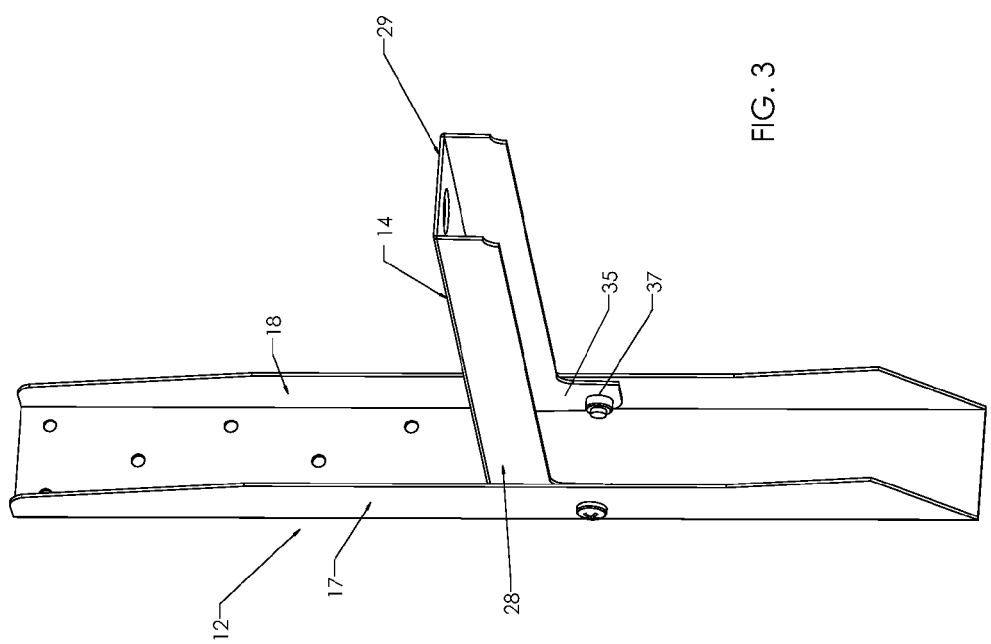
FIG. 3 illustrates an embodiment of hingedly connecting a horizontal member to a vertical member.
Figure 4:
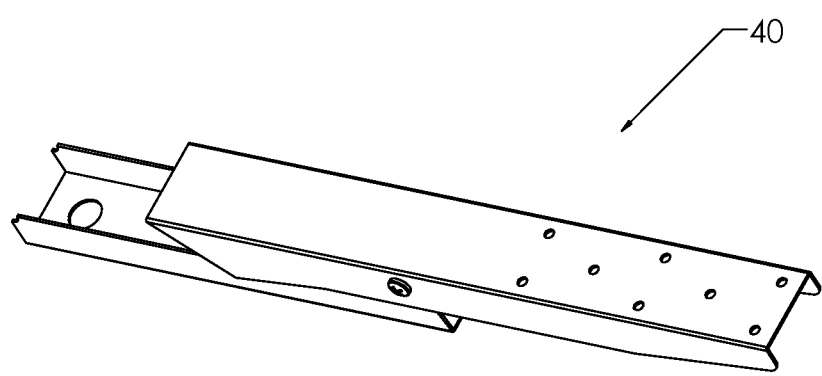
FIG. 4 illustrates the bracket in a closed position.
Figure 5:
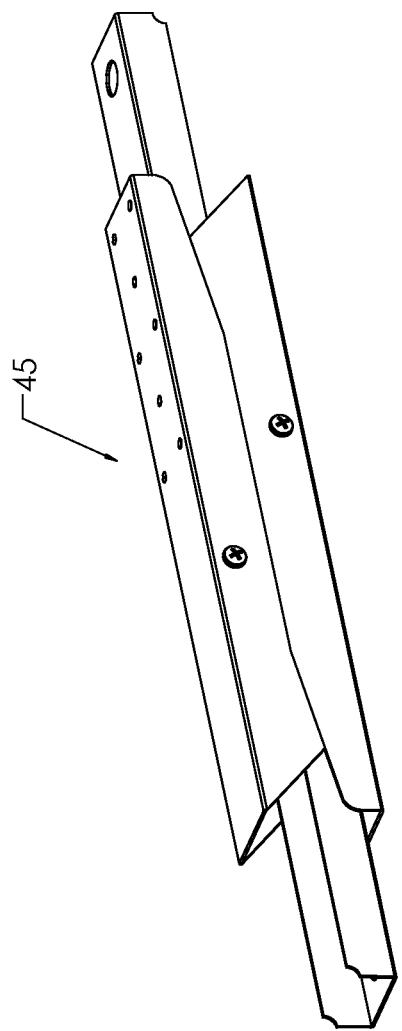
FIG. 5 illustrates a closed bracket stacked on top of another bracket.

FIG. 3 illustrates an embodiment of hingedly connecting the horizontal member 14 to the vertical member 12. At a first end 28 of the horizontal member, the horizontal member side walls 26, 27 each have an attaching member 35 with a hole 37, defining a point of attachment for the horizontal member, and for aligning and pivotally engaging with the hole 23 on each of the vertical members side walls 17, 18, about ⅓ to ½ from the inferior end 21 of the vertical member 12 via screws or pins. The horizontal member 14 can pivot around the screws or pins until it contacts the vertical member 12 in a closed position 40, where the horizontal member is parallel to the vertical member, as shown in FIG. 4. The horizontal member 14 can pivot to extend away from vertical member 12 to an open position, as show in FIG. 1 and FIG. 2, wherein the horizontal member 14 is in a horizontal position and perpendicular to the vertical member 12. The bracket may be stored in either an open or closed position. Storing the bracket in the closed position will save space in storage. FIG. 5 illustrates two brackets in the closed position, stacked 45. The stacked 45 brackets provide for easy storage.

The pivot joint can be done in many ways. The general description of the pivot joint may be a pin, screw, or bearing which allows the two brackets to rotate around the axis of the pivot, but lock both the linear degrees of freedom. The bracket can rotate but it cannot translate with respect to the pivot axis. There are many possible pivot designs that can be used. Generally, there is some sort of pin, which goes through the vertical member 12 and the horizontal member 14. The pin must be able to rotate in at least one of the two parts, but it can rotate in both. In an embodiment, a screw may acts as a pin, and it is into the horizontal member 14. Since the horizontal member 14 has a hole 37 in it, a screw will not generally rotate with respect to the horizontal member 14, but it does with respect to the vertical member 12, which has a hole 23 slightly larger than the outer diameter of the screw. Other ways to make the pivot different include creating a protrusion out of one of the parts and a hole in the other. Ball bearings, bronze or plastic bushings can also be used instead of the hole to increase the load capacity of the pivot.

The horizontal member 14 helps to keep the vertical member 12 upright, by supporting the vertical member 12 against being pushed down. It is important that the connection between the vertical member 12 and the horizontal member 14 can support against the vertical member 12 being pushed past vertical. In the implementation of the present invention, this is achieved by the pivot joint which is below the main contact point between the vertical member 12 and the horizontal member 14. When the vertical member 12 is pushed back, there is a force couple at the pivot joint, and the compression force between the main walls of the horizontal 14 and vertical 12 members. These two opposing forces provide the moment to help keep the vertical member 12 upright. The joint between these two members can be made in other ways including multiple bolt locations, welding, riveting, and even forming operations that lock the two pieces together in multiple locations. We chose a pivot, and the main wall in order to allow the bracket to fold in one direction for storage purposes, while providing a strong moment in the other direction.

Figure 6:
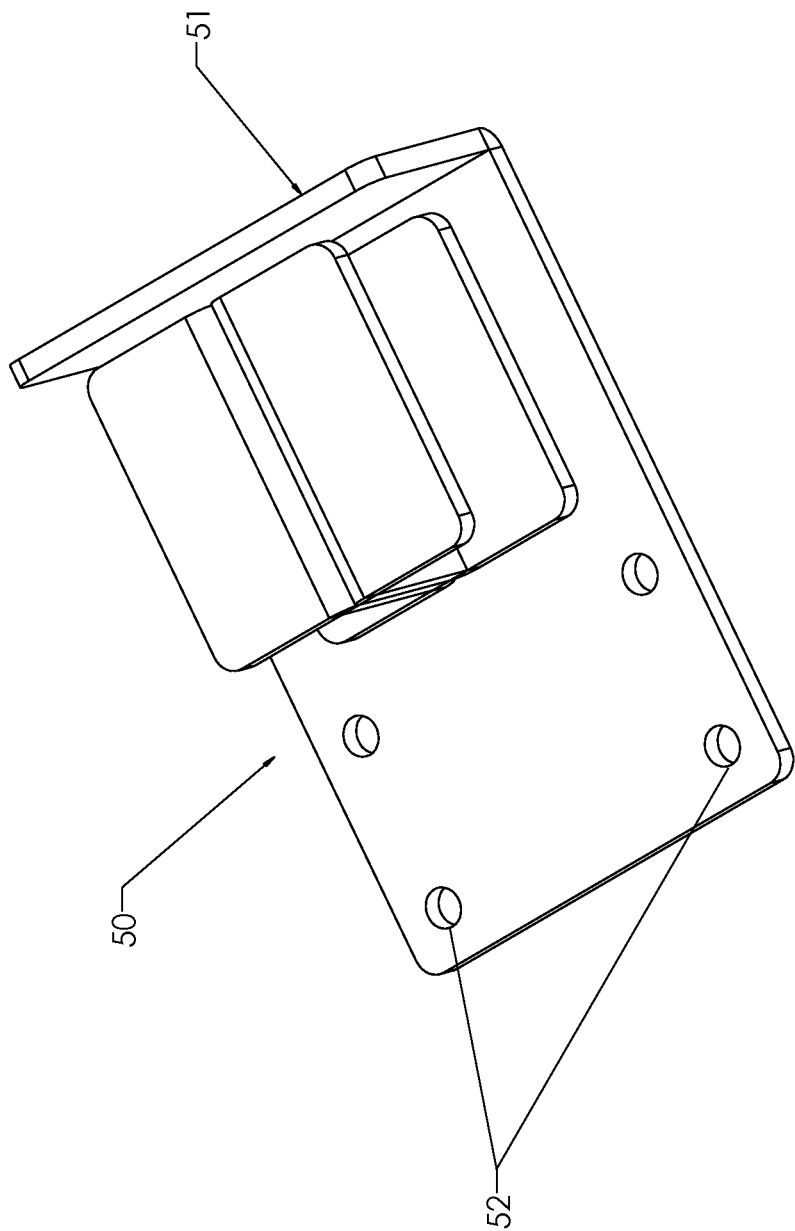
FIG. 6 illustrates an installation tool used to install the bracket into the ground.
Figure 7:
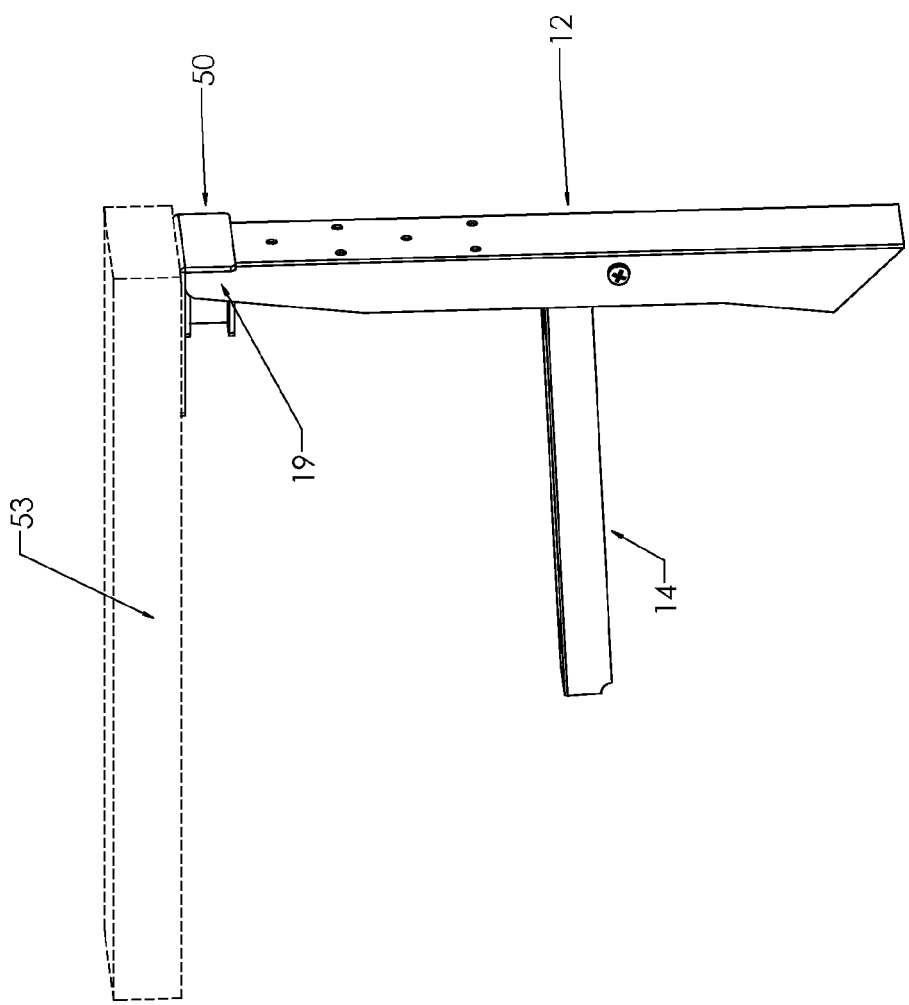
FIG. 7 illustrates the installation tool as used by attaching it to a 2×4 piece of wood used to install the bracket into the ground.

For purposes of illustration, FIG. 6 is an installation tool 50 used to install the bracket of the present invention for use, having a front wall 51 and holes 52 for engaging a 2×4 piece of wood 53, illustrated in FIG. 7. As shown in FIG. 7, the front wall 51 of the installation tool slides over the superior end 19 of the vertical member 12, and a hammer is used to apply direct force on the 2×4 to push the vertical member into the ground.

Figure 8:
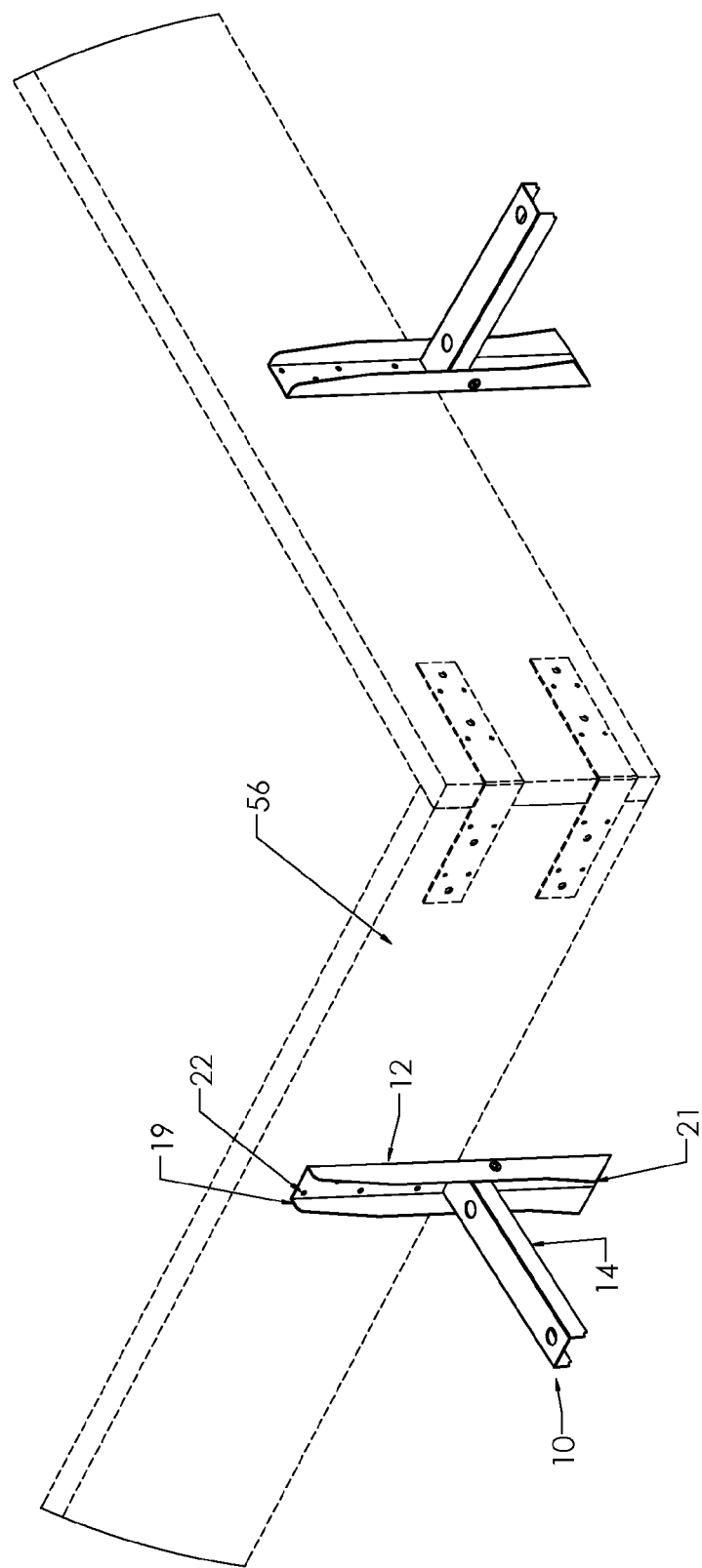
FIG. 8 illustrates brackets in use supporting an ice rink.

The bracket of the present invention is used when assembling an outside ice rink. The procedure is to drive the bracket into the ground possibly having soil, grass or other penetrable material. The brackets are spaced around the perimeter of a rink, having distances between the brackets enough to provide adequate support to the boards being used to create the ice rink. The dimensions of an ice rink are determined as relating to the length and width and location and position of the boards that will contain the ice for skating. Multiple brackets of the present invention are installed along the determined length and width of the rink. FIG. 8 demonstrates the orientation of the bracket 10 of the present invention in relationship to the boards of the ice rink. As described above, the bracket 10 is installed using the installation tool 50 in FIG. 7. The vertical member 12 alone is a spike strong enough to support the load of a rink. When being used, the vertical member's 12 inferior end 21 is positioned on the ground and the installation tool engages the superior end 19. While installing the bracket, the horizontal member 14 pivots to the horizontal position and flattens with the ground. The horizontal member is optionally secured with the ground by engaging a hammer over a 2×4 piece of wood to secure the channel of the horizontal member 14 to the ground. Due to the surface area of the horizontal member 14, it will not be submerged into the ground and the vertical member 12 is prevented from tipping under the load of the ice rink. The range of pivot is stopped in the horizontal position, which eliminates the need for a diagonal member in the bracket 10. The boards 56 of the ice rink are installed along the predetermined length and width of the rink and are engaged with each bracket of the present invention, optionally secured through the holes 22 with a screw on the vertical member back wall 16.

Once the perimeter is built of brackets and boards, an impermeable liner is placed over the boards, and filled with water. The water is then allowed to freeze either by ambient temperature or by refrigeration. The ice rink is then ready for use. In the case of a thaw, the impermeable liner and the boards supported by the brackets keep the water contained for future refreezing.

Figure 9:
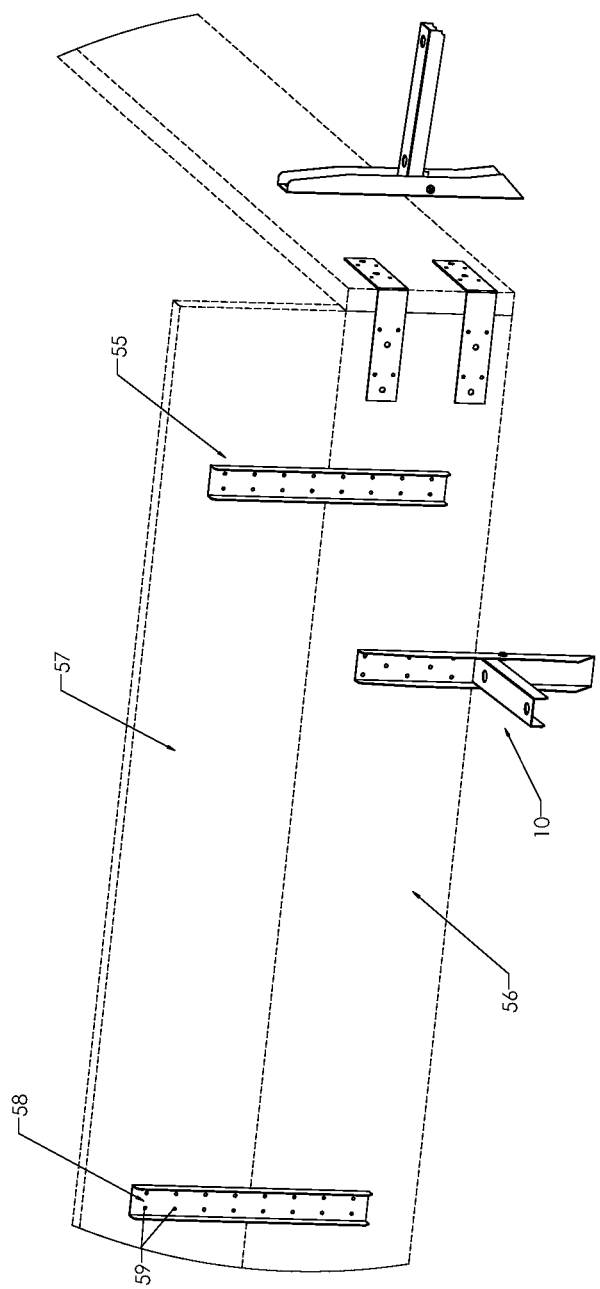
FIG. 9 illustrates a system of brackets used to extend the height of an ice rink.

For purposes of illustration, FIG. 9 discloses a method of increasing the height of the perimeter of an ice rink by using the installation technique as described above and illustrated in FIG. 8, however additionally providing an extender bracket 55 securely engaging the board 56 of the perimeter of the ice rink with any securing means such as screws through the holes 59 on the extender bracket back wall 58, as well as the a second level board 57 directly placed on top of the boards 56 of the perimeter of the rink.

The brackets of the present invention are made of metal, preferably sheet metal. The metal is punched, laser cut or cut to shape by other means known in the art. The bracket is bent to shape using a press brake or some other means of forming metal. The horizontal member 14 and vertical member 12 may be made with a progressive die to do the punching and forming in the same operation. The horizontal member 14 and vertical member 12 are optionally painted or coated to resist corrosion. The horizontal member 14 and vertical member 12 are then assembled with the screws into the final assembly.

The brackets are made from rigid material. Preferably the brackets in the present invention are made of metal or stainless steel. In order to make a compact bracket, it is important to choose a material that has high strength characteristics as well as high stiffness characteristics. In an embodiment ASTM-A1008 Commercial Cold Rolled Steel is used to form the bracket. It is readily available for the manufacturing of stamped parts. Some of the other materials that could also be considered are the many alloys of stainless steel, Titanium Alloys, Aluminum Alloys, and even composite materials. While many of these come at cost premiums to steel, they also provide some additional benefits in terms of corrosion resistance and possibly weight savings. While plastics can support the loads necessary, the cross sections and additional structural ribs make the support brackets large and bulky.

Sheet metal manufacturing is very commonly used in many components used in everyday life. Many large home appliances are housed inside of sheet metal enclosures. Most ranges, refrigerators, microwaves, garage door openers, washing machines, dish washers, and clothes dryers have sheet metal enclosures. It is a common cost effective process with many vendors able to produce parts in high quantities efficiently. It is an ideal process for making this bracket. Sheet metal parts are first cut from either flat sheets, or rolls of material. This cutting is usually done with either laser cutting or punching although there are some other possibilities like water jet, plasma cutting, and even machining or any means known in the art. These flat parts then need to be formed to the proper shape. This forming process is usually done on a brake press, which can bend sheet metal in a specific location, to a specific angle, at a given internal radius. There are processes like progressive dies, which have stages and inside of just one press, the parts are cut and formed sequentially. They stay together until the last process is performed, and then the part falls out. The other parts index through the stations with a new part entering in each press actuation, and another finished part exiting. The early stations cut, while the later stations form. Finally the last station cuts the part from the web that carries all the parts through the press and the part falls out complete. The parts may be treated to resist corrosion by painting or other means known in the art. The two parts are then assembled with screws.

Although preferred embodiments of the disclosure are illustrated and described in connection with particular features, it will be apparent to those skilled in the art that the bracket of the present invention, or variations thereof, can be adapted for use for a wide variety of industries such as, the brackets may be used to secure and provide support to boards used for pouring cement or to hold boards to edge asphalt roads. Various features of the disclosure have been particularly shown and described in connection with illustrated embodiments. However, it must be understood that the particular embodiments merely illustrate and that the invention is to be given its fullest interpretation within the terms of the claims.

The invention claimed is:

1. A bracket for supporting a structure, comprising:
  a. an elongated rigid vertical member comprising a vertical member back wall, and a vertical member first side wall at a 90 degree angle from said vertical member back wall and a vertical member second side wall at a 90 degree angle to said vertical member back wall forming an elongated channel, said vertical member first side wall and said vertical member second side wall comprise a hole to define a point of attachment, said vertical member comprises a superior and an inferior end, wherein said defined point of attachment is about ⅓ to ½ of the entire length of said vertical member, above said inferior end of said vertical member; and
  b. an elongated rigid horizontal member comprising a horizontal member back wall, a horizontal member first side wall at a 90 degree angle from said horizontal member back wall and a horizontal member second side wall at a 90 degree angle to said horizontal member back wall, forming an elongated channel, said horizontal member comprising a first end, the horizontal member first side wall has a first attaching member with a hole at said first end, and the horizontal member second side wall has a second attaching member with a hole at said first end;
  c. said bracket does not com rise a diagonal member; and
  wherein the horizontal member is hingedly connected to the vertical member at the point of attachment of said vertical member, with said first attaching member and second attaching member of said horizontal member, and said horizontal member may hinge between a perpendicular position in relation said vertical member and a parallel position in relation to said vertical member, and said vertical member is positioned into the ground to the point of the horizontal member is flattened with the ground.

2. The bracket of claim 1, wherein said vertical member optionally has at least one hole on said vertical member back wall.

3. The bracket of claim 1, wherein said horizontal member further comprises a first hole at said first end of said horizontal member, for optionally receiving a stake.

4. The bracket of claim 1, wherein said horizontal member further comprises a second end, wherein said second end optionally comprises a second hole for optionally receiving a stake.

5. The bracket of claim 1, wherein said horizontal member is hingedly connected to said vertical member with a screw.

6. The bracket of claim 1, wherein said bracket is installed along the perimeter of a structure requiring support.

7. The bracket of claim 6, wherein said structure is a rink.

8. The bracket of claim 1, wherein said bracket is stored when said horizontal member is parallel to said vertical member.

9. The bracket of claim 1, wherein said brackets are stacked when said horizontal member is parallel to said vertical member.

10. A bracket to support a structure comprising:
    a. an elongated rigid channeled vertical member comprising a vertical member back wall, a vertical member first side wall and a vertical member second side wall, said vertical member first side wall and said vertical member second side wall comprise a hole to define a point of attachment, said vertical member comprises a superior and an inferior end, wherein said defined point of attachment is about ⅓ to ½ of the entire length of said vertical member, above said inferior end of said vertical member; and
    b. an elongated rigid channeled horizontal member comprising, a horizontal member back wall, a horizontal member first side wall and a horizontal member second side wall, said horizontal member comprising a first end, said horizontal member first side wall has a first attaching member at said first end with a point of attachment for engaging said vertical member, and the horizontal member second side wall has a second attaching member with a point of attachment for engaging said vertical member;
    c. said bracket does not com rise a diagonal member; and wherein the horizontal member is hingedly connected to the vertical member at the point of attachment of said vertical member, with said first attaching member and second attaching member of said horizontal member, and said vertical member is positioned into the ground to the point of the horizontal member is flattens with the ground.

11. The bracket of claim 10, wherein said horizontal member is hingedly connected to said vertical member with a screw.

12. The bracket of claim 10, wherein said bracket is installed along the perimeter of a structure requiring support.

13. The bracket of claim 12, wherein said structure is an ice skating rink.

14. A bracket for supporting a structure, comprising:
    a. an elongated rigid channeled vertical member comprising at least one point of attachment on said vertical member, said vertical member comprises a superior and an inferior end, wherein said defined point of attachment is about ⅓ to ½ of the entire length of said vertical member, above said inferior end of said vertical member;
    b. an elongated rigid channeled horizontal member comprising at least one point of attachment on said horizontal member;
    c. said bracket does not com rise a diagonal member and wherein the at least one point of attachment of the horizontal member is hingedly connected to the at least one point of attachment of the vertical member, and said vertical member is positioned into the ground to the point of the horizontal member is flattens with the ground.

15. The bracket of claim 14, wherein said bracket is installed along the perimeter of a structure requiring support.

16. The bracket of claim 14, wherein said bracket is made of metal.

17. The bracket of claim 14, wherein said horizontal member may hinge between a perpendicular position in relation said vertical member and a parallel position in relation to said vertical member.

* * * * *